(12) United States Patent
Chen et al.

(10) Patent No.: US 7,409,057 B1
(45) Date of Patent: Aug. 5, 2008

(54) NONLINEAR ECHO COMPENSATOR FOR CLASS B TRANSMITTER LINE DRIVER

(75) Inventors: Xiaopeng Chen, Sunnyvale, CA (US); Runsheng He, Sunnyvale, CA (US); Shuran Wei, San Jose, CA (US)

(73) Assignee: Marvell International Ltd., Hamilton (BM)

( * ) Notice: Subject to any disclaimer, the term of this patent is extended or adjusted under 35 U.S.C. 154(b) by 1329 days.

(21) Appl. No.: 10/189,321

(22) Filed: Jul. 3, 2002

(51) Int. Cl.
*H04M 9/08* (2006.01)
(52) U.S. Cl. ............................. 379/406.08; 379/406.06
(58) Field of Classification Search ............ 379/406.01, 379/406.06, 406.08
See application file for complete search history.

(56) References Cited

U.S. PATENT DOCUMENTS 3,647,992 A * 3/1972 Thomas ................. 379/406.08

OTHER PUBLICATIONS

U.S. Appl. No. 09/920,240, filed Aug. 1, 2001, Roo et al.
U.S. Appl. No. 09/465,228, filed Dec. 17, 1999, Kim.
IEEE std. 802.3ab—1999, *Sponsor LAN MAN Standards Committee of IEEE Computer Society*, "Supplement to Carrier Sense Multiple Access with Collision Detection (CSMA/CD) Access Method and Physical Layer Specifications—Physical Layer Parameters and Specifications for 1000Mb/s Operation Over 4-Pair of Category 5 Balanced Copper Cabling, Type 1000BaseT."

* cited by examiner

*Primary Examiner*—Curtis Kuntz
*Assistant Examiner*—Alexander Jamal

(57) ABSTRACT

A nonlinear echo compensator compensates for nonlinear echo in a transceiver including a transmitter line driver with current cells that are operated in a Class B operating mode. A mapping circuit generates a pattern dependent driving signal. A coefficient generator generates a compensator coefficient. A canceling circuit communicates with the mapping circuit and the coefficient generator and compensates for nonlinear echo in a received signal based on the pattern dependent driving signal and the compensator coefficient.

56 Claims, 11 Drawing Sheets

CLASS B

| PC | NC | Level |
|---|---|---|
| 8 | 0 | 8 |
| 6 | 0 | 6 |
| 4 | 0 | 4 |
| 2 | 0 | 2 |
| 0 | 0 | 0 |
| 0 | 2 | -2 |
| 0 | 4 | -4 |
| 0 | 6 | -6 |
| 0 | 8 | -8 |

FIG. 8
Prior Art

CLASS A

| PC | NC | Level |
|---|---|---|
| 8 | 0 | 8 |
| 7 | 1 | 6 |
| 6 | 2 | 4 |
| 5 | 3 | 2 |
| 4 | 4 | 0 |
| 3 | 5 | -2 |
| 2 | 6 | -4 |
| 1 | 7 | -6 |
| 0 | 8 | -8 |

FIG. 7
Prior art

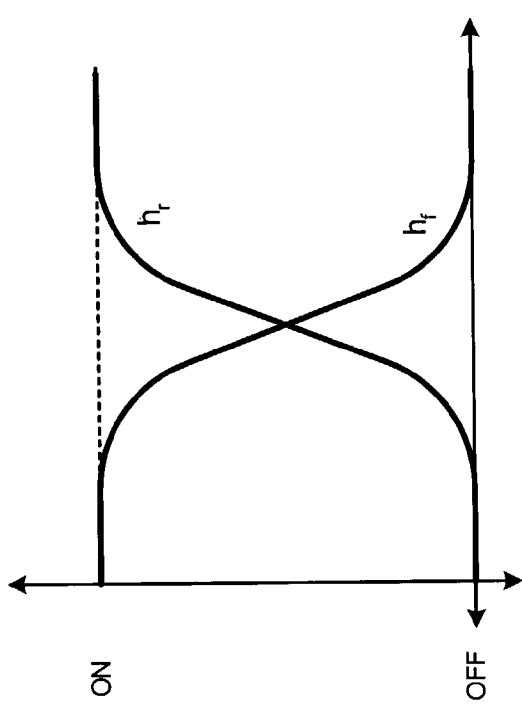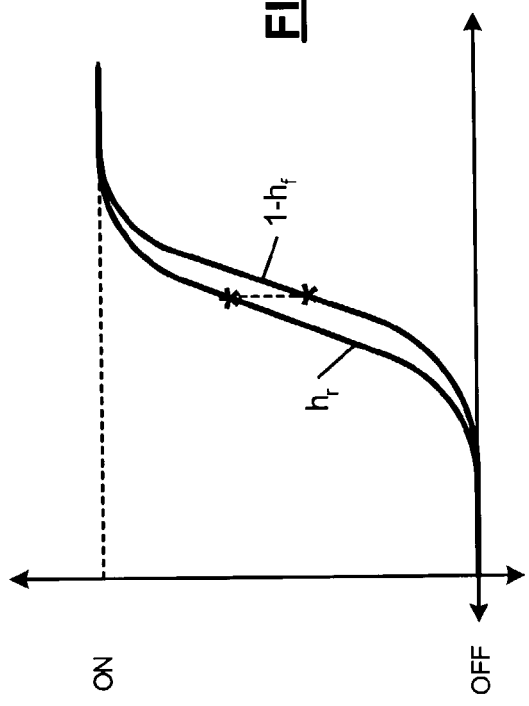

NONLINEAR ECHO COMPENSATOR FOR CLASS B TRANSMITTER LINE DRIVER

FIELD OF THE INVENTION

The present invention relates to transmitting and receiving electrical signals through a communications channel, and more particularly to a nonlinear echo compensator for a Class B transmitter line driver.

BACKGROUND OF THE INVENTION

IEEE section 802.3 ab, which is hereby incorporated by reference, specifies physical layer parameters for 1000 BaseT (gigabit) communications channels. The gigabit communications channel employs four twisted pairs of cable. Signals transmitted over the cable are degraded by signal attenuation, return loss, echo, and crosstalk.

Referring now to FIG. 1, a gigabit Ethernet communications channel 10 is shown. The communications channel 10 includes two nodes 12 and 14 that transmit and receive one gigabit per second (Gbps). The node 12 includes transceivers 16-1, 16-2, 16-3, and 16-4 and the node 14 includes transceivers 18-1, 18-2, 18-3 and 18-4. Each transceiver transmits at 250 Mbps. The transceivers 16 and 18 are connected to opposite ends of twisted pairs 20-1, 20-2, 20-3, and 20-4. For example, the transceiver 16-1 is connected to one end of the twisted pair 20-1. The transceiver 18-1 is connected to the opposite end of the twisted pair 20-1. Each transceiver 16 and 18 includes a transmitter 24, a receiver 26, and a hybrid circuit 28.

The transmitter 24 of the transceiver 16-1 generates a five level pulse amplitude modulated (PAM-5) signal that is transmitted by the transmitter 24 and the hybrid circuit 28 of the transceiver 16-1 onto the twisted pair 20. The hybrid circuit 28 and the receiver 26 of the transceiver 18-1 receive the PAM-5 signal. The hybrid circuit 28 enables bi-directional transmission over the same twisted pairs by filtering out the transmit signal at the receiver 26.

Attenuation refers to signal loss of the twisted pair between the transmitter of one receiver and the receiver of another transceiver and is caused by several factors including skin effect. To minimize the effect of attenuation, the lowest possible frequency range that supports the required data rate is typically used. Return loss quantifies the amount of power that is reflected due to cable impedance mismatches.

Echo occurs when signals are transmitted and received on the same twisted pair. Echo is caused by residual transmit signals and cable return loss. Crosstalk occurs due to signal coupling between twisted pairs that are in close proximity. For example, the twisted pairs used in 1000 BaseT are affected by crosstalk from adjacent twisted pairs. Near end crosstalk (NEXT) is crosstalk at the transmitter end of the twisted pair. Far-and crosstalk (FEXT) is crosstalk at the receiver end of the twisted pair. Crosstalk is preferably minimized to improve receiver symbol recovery.

Referring now to FIG. 2, the transceiver 16 includes a transmitter line driver 50 that receives a transmitter signal 52. The transmitter line driver 50 outputs a multi-level signal to a load such as a matched resistor 54. A transformer 58 couples the transceiver 16 to a twisted pair 60. A replica signal generator 64 outputs a replica of the transmitter signal 52 to a summer 66. A received signal 68 is also input to the summer 66.

Since the communications channel transmits and receives on the same twisted pair 60, the replica transmitted signal is cancelled or subtracted from the received signal 68. In addition, compensation for NEXT and echo is performed. An output of the summer 66 is input to an optional low pass filter (LPF) 70. An output of the LPF 70 is input to an analog to digital converter (ADC) 74. An output of the ADC 74 is input to a summer 78. A linear echo compensation circuit 82 and NEXT compensation circuit 83 (for $NEXT_{12}$, $NEXT_{13}$, and $NEXT_{14}$) are also input to the summer 78. A signal ($TA_{comp}$) with NEXT and linear echo compensation is output by the summer 78. Additional details concerning the transceiver 16 can be found in "Active Resistive Summer for a Transformer Hybrid", U.S. patent application Ser. No. 09/920,240, filed Aug. 1, 2001, and "A Method and Apparatus for Digital Near-End Echo/Near-End Crosstalk Cancellation with Adaptive Correlation", U.S. patent application Ser. No. 09/465,228, filed Dec. 17, 1999, which are hereby incorporated by reference.

Referring now to FIG. 3, the transmitter line driver 50 is shown further and typically includes a plurality of positive current cells 84 and negative current cells 86. A transmitter driver control 88 selectively switches the positive and negative current cells 84 and 86 on and off to produce positive and negative signal levels. For example, the transmitter line driver for 1000 BaseT employs five symbol levels –2, –1, 0, +1, and +2, which are usually implemented as 0V, +/–0.5V and +/–1V. Future communications systems may include additional symbol levels for increased bandwidth. For example, future signal levels may include 0, +/–2, +/–4, +/–6, and +/–8 signal levels.

Referring now to FIG. 4, a conceptual illustration of the transmitter line driver 50 is shown. The positive current cells 84 can be thought of as a plurality of individual current sources 90-1, 90-2, 90-3, . . . , and 90-n that are switched by switches $SW_{P1}$, $SW_{P2}$, $SW_{P3}$, . . . , and $SW_{Pn}$. The negative current cells 86 can be thought of a plurality of individual current sources 92-1, 92-2, 92-3, . . . , and 92-m that are switched by switches $SW_{N1}$, $SW_{N2}$, $SW_{N3}$, . . . , and $SW_{Nm}$. Typically, m=n. Referring now to FIG. 5, an exemplary-positive current cell 96 is shown. In FIG. 6, an exemplary negative current cell 98 is shown. As can be appreciated, other positive and negative current cells can be utilized.

When the transmitter line driver 50 is operated in a Class A operating mode, the number of positive current cells that are turned on/off for a transition from a first signal level to a second signal level is equal to the number of negative current cells that are turned off/on. When the transmitter line driver 50 is operated in a Class B operating mode, the number of positive current cells that are turned on/off for a transition from a first signal level to a second signal level is not equal to the number of negative current cells that are turned off/on. The advantage of Class B operation is reduced power consumption as compared with Class A operation.

Referring now to FIG. 7, Class A operation of the positive and negative current cells 84 and 86 for nine symbol levels is shown. As can be appreciated, when switching between signal level 6 and signal level –4, there are an equal number of positive and negative current cells being turned on and off. In particular, five positive current cells are being turned off and five negative current cells are being turned on.

Referring now to FIG. 8, exemplary Class B operation of the positive and negative current cells 84 and 86 is shown. As can be appreciated, when switching between signal level 6 and signal level –4, an unequal number of positive and negative current cells are turned on and off. In particular, six positive current cells are turned off and four negative current cells are turned on. While Class B operation provides reduced power consumption, the asymmetry of Class B operation causes nonlinear echo that degrades performance.

SUMMARY OF THE INVENTION

A nonlinear echo compensator according to the present invention compensates for nonlinear echo in a transceiver including a transmitter line driver with current cells that are operated in an asymmetric low power mode. A mapping circuit generates a pattern dependent driving signal. A canceling circuit communicates with the mapping circuit and compensates for nonlinear echo in a received signal based on the pattern dependent driving signal.

In other features, the mapping circuit receives a multi-level signal and maps the multi-level signal to the pattern dependent driving signal. The mapping circuit includes a symbol weighting circuit that generates a weighted signal. The symbol weighting circuit generates the weighted signal by summing a first product of a current symbol and a first weighting factor with a second product of a prior symbol and a second weighting factor. The mapping circuit includes a function generator that generates the pattern dependent driving signal based on the weighted signal and a scaling circuit that scales the pattern dependent driving signal.

In still other features, a coefficient generator generates a first compensator coefficient based on a sum of a prior compensator coefficient and a product of an error signal and a sign function of the pattern dependent driving signal. The coefficient generator generates first, second and third compensator coefficients.

In other features, the canceling circuit includes a first multiplier that has a first input that receives the pattern driving signal and a second input that receives the first compensator coefficient. The first multiplier generates a first product. A second multiplier has a first input that receives the pattern driving signal and a second input that receives the second compensator coefficient. The second multiplier generates a second product. A third multiplier has a first input that receives the pattern driving signal and a second input that receives the third compensator coefficient. The third multiplier generates a third product.

In still other features, the canceling circuit further includes a first unit delay that receives the third product of the third multiplier. A first summer has a first input that receives the second product of the second multiplier and a second input that communicates with the first unit delay. A second unit delay communicates with an output of the first summer. A second summer has a first input that communicates with the second unit delay and a second input that receives the first product of the first multiplier.

Further areas of applicability of the present invention will become apparent from the detailed description provided hereinafter. It should be understood that the detailed description and specific examples, while indicating the preferred embodiment of the invention, are intended for purposes of illustration only and are not intended to limit the scope of the invention.

BRIEF DESCRIPTION OF THE DRAWINGS

The present invention will become more fully understood from the detailed description and the accompanying drawings, wherein:

FIG. 7 is a table illustrating Class A operation of the transmitter line driver according to the prior art;

FIG. 8 is a table illustrating Class B operation of the transmitter line driver according to the prior art;

FIG. 9 illustrates ideal current cell rise and fall transition characteristics;

FIG. 10 illustrates actual current cell rise and fall transition characteristics;

DETAILED DESCRIPTION OF THE PREFERRED EMBODIMENTS

Figure 1:
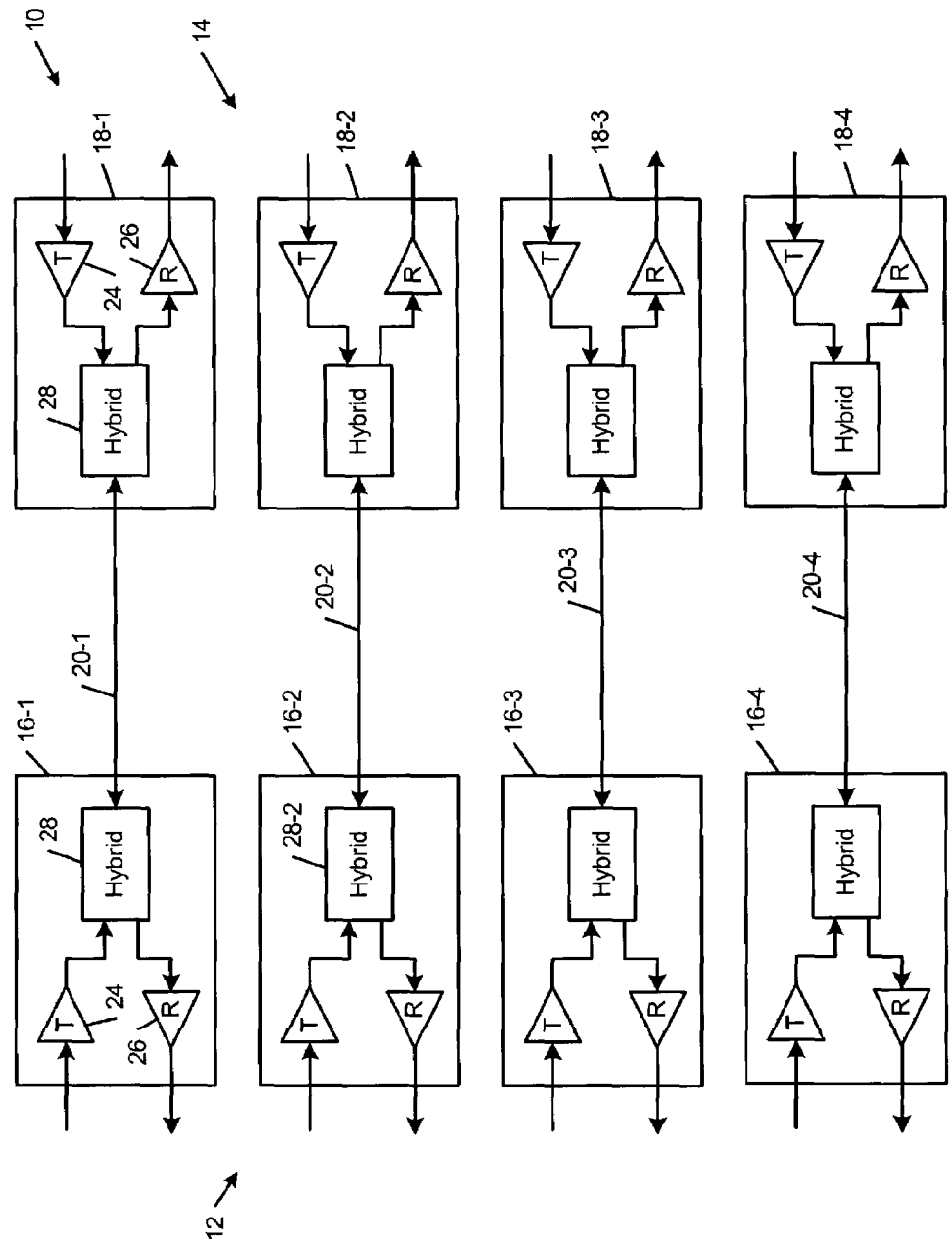
FIG. 1 is a functional block diagram illustrating an exemplary gigabit communications channel according to the prior art.
Figure 2:
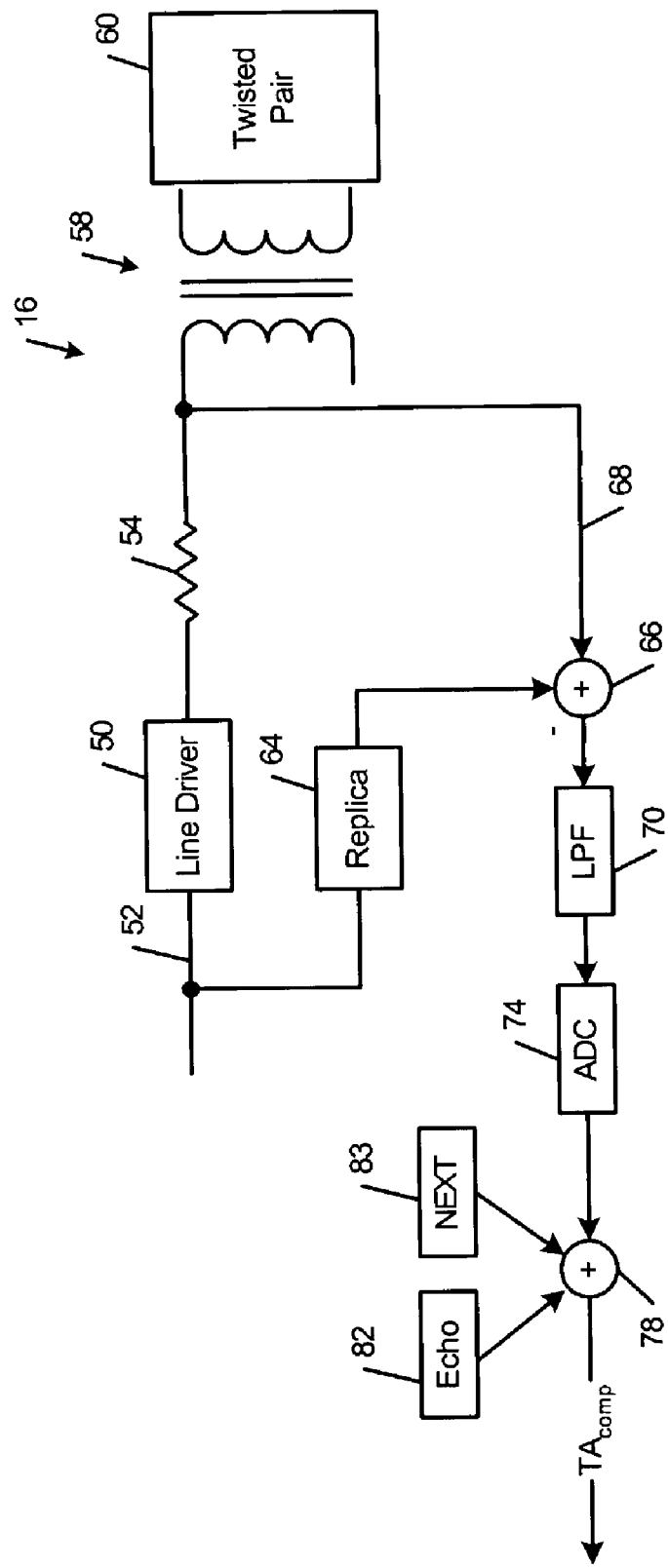
FIG. 2 is a functional block diagram illustrating a transceiver with a transmitter line driver and linear echo, NEXT and replica transmitter signal compensation according to the prior art.
Figure 4:
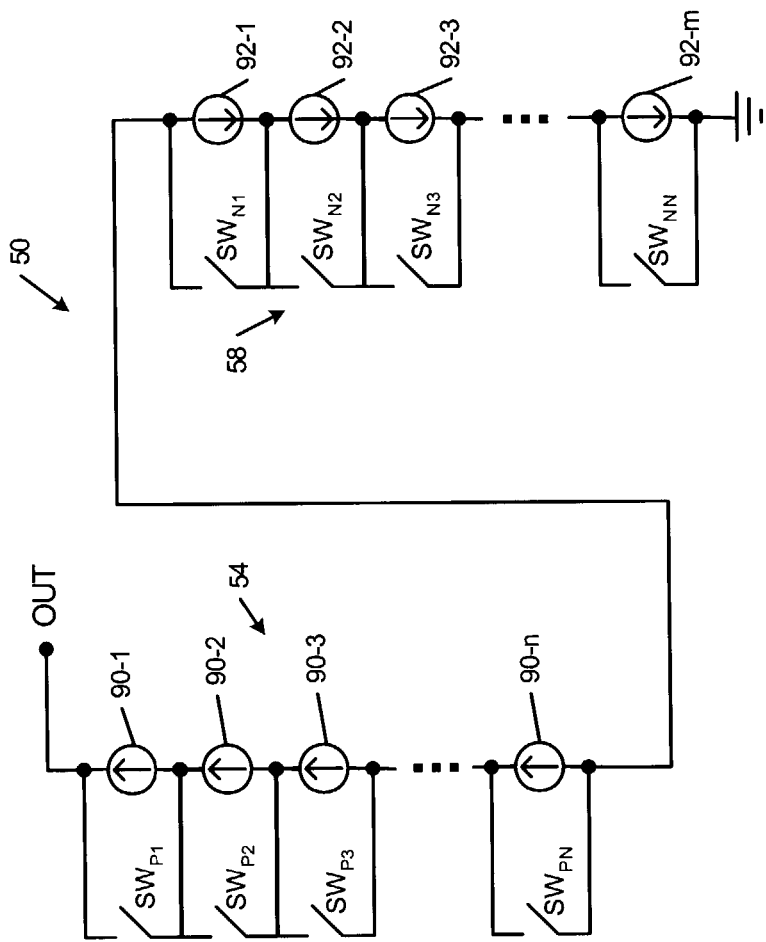
FIG. 4 is a conceptual electrical schematic of the transmitter line driver according to the prior art.
Figure 3:
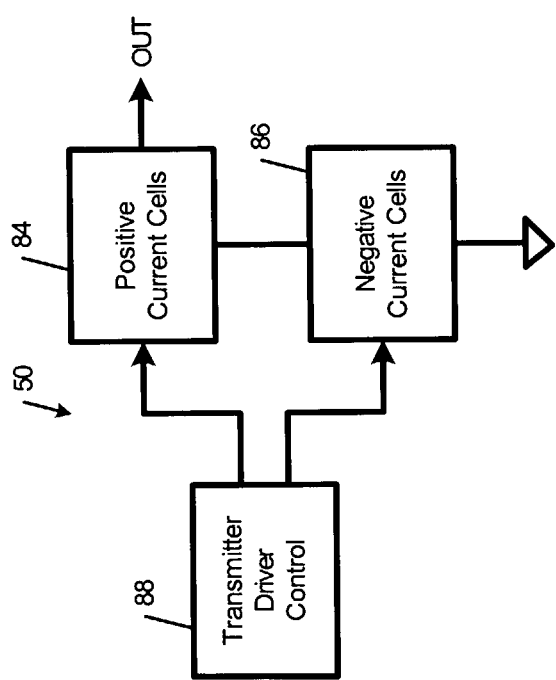
FIG. 3 is a functional block diagram of the transmitter line driver of FIG. 2 according to the prior art.
Figure 6:
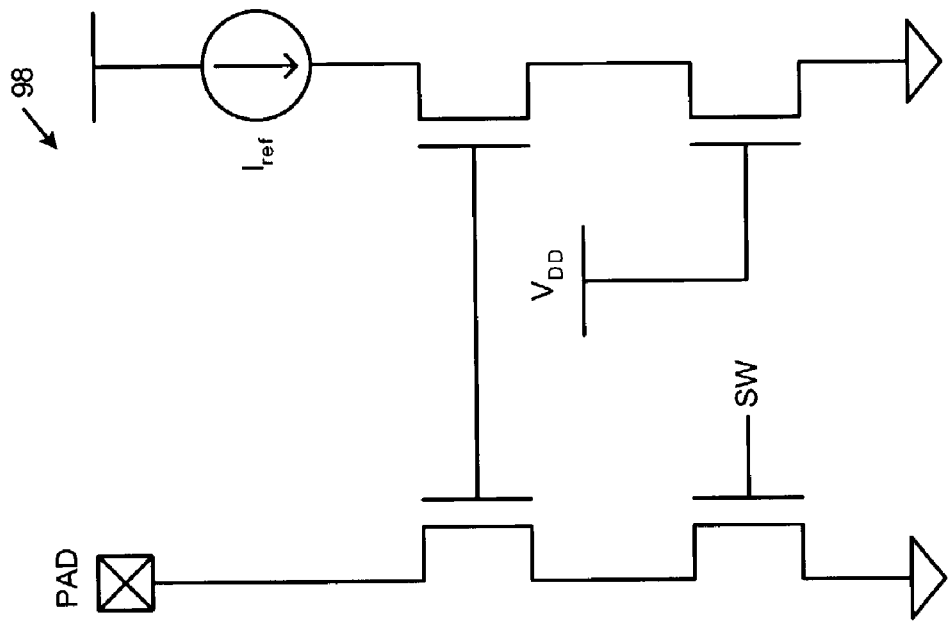
FIG. 6 is an electrical schematic of an exemplary negative current cell in the transmitter line driver according to the prior art.
Figure 5:
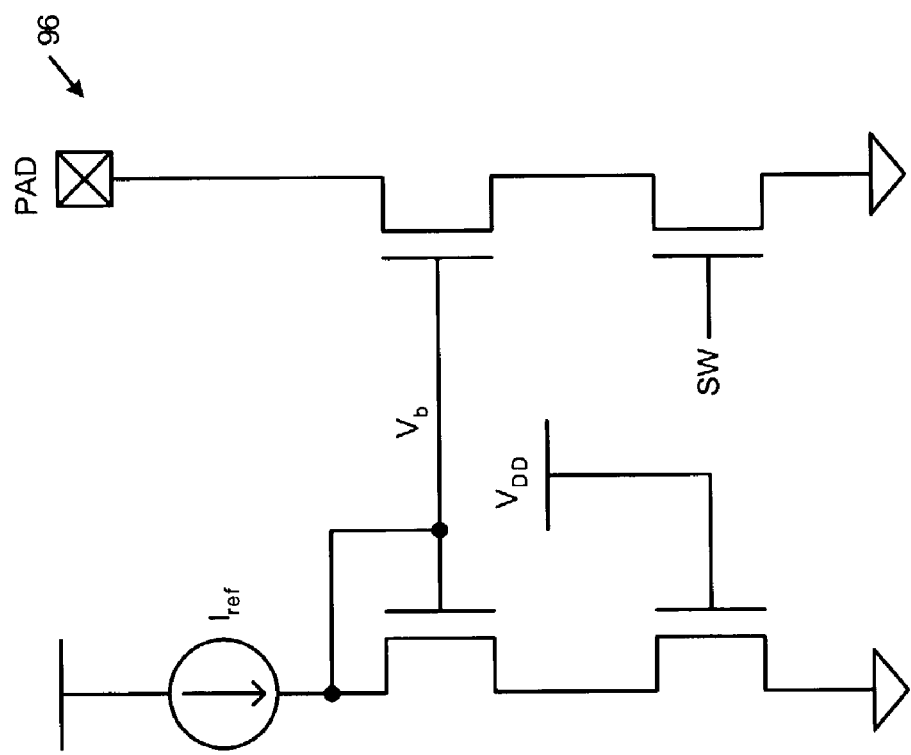
FIG. 5 is an electrical schematic of an exemplary positive current cell in the transmitter line driver according to the prior art.

The following description of the preferred embodiment(s) is merely exemplary in nature and is in no way intended to limit the invention, its application, or uses. For purposes of clarity, the same reference numerals will be used in the drawings to identify similar elements.

Referring now to FIG. 9, rise $h_r$ and fall $h_f$ characteristics of an ideal current cell is shown. As can be appreciated, the ideal rise $h_r$ and fall $h_f$ characteristics are symmetric such that $h_r + h_f = 1$. In FIG. 10, rise $h_r$ and fall $h_f$ characteristics of typical current cells are not ideal. For some time periods, $h_r + h_f \neq 1$. The nonlinear echo compensation circuit for the Class B driver according to the present invention compensates for nonlinear echo that is introduced as a result of this asymmetry. The transmitter line driver of the transceiver according to the present invention can be operated in the Class B mode with reduced power consumption and without sacrificing performance.

The sampling point of the ADC 74 is determined by the received signal and not by the transmitted signal. In some cases, the sampling point occurs when the difference between $h_r$ and $1-h_f$ is greater than zero. The replica transmitter signal does not have nonlinear echo characteristics because the replica transmitter signal is not generated by the transmitter line driver, which is the source of the nonlinear echo.

Figure 11:
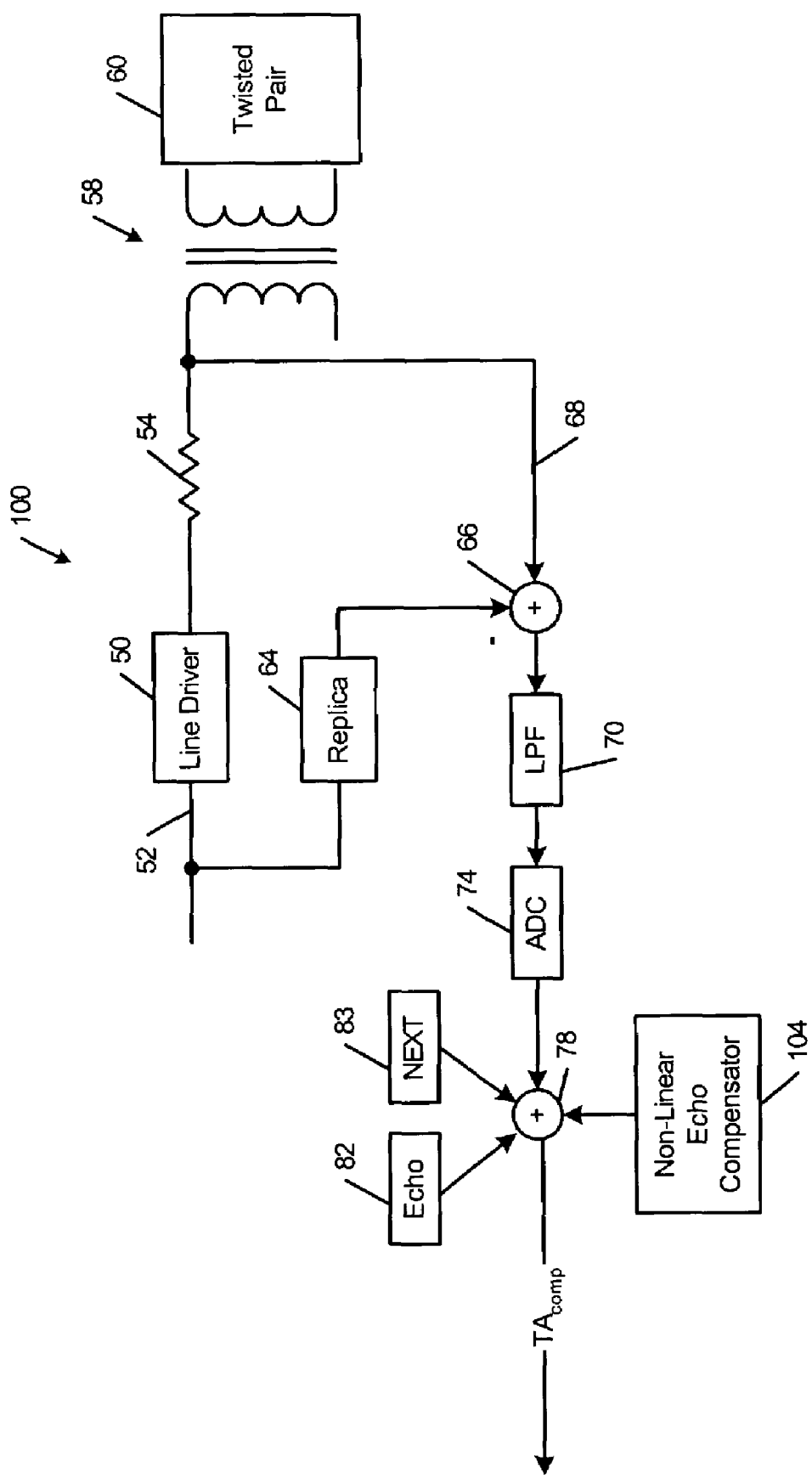
FIG. 11 is a functional block diagram illustrating a transceiver with a transmitter line driver and linear and nonlinear echo, NEXT and transmitter signal compensation according to the present invention.

Referring now to FIG. 11, a transceiver 100 according to the present invention receives a transmitter signal 52. The transmitter line driver 50 supplies a multi-level signal to a load such as the matched resistor 54 based on the transmitter signal 52. The transformer 58 couples the transmitter line driver 50 to the twisted pair 60. The replica signal generator 64 outputs a replica of the transmitter signal 52 to the summer 66. The received signal 68 is also input to the summer 66.

The output of the summer 66 is input to the LPF 70. An output of the LPF is input to the ADC 74. The output of the ADC 74 is input to the summer 78. The linear echo compensation signal from the linear echo compensation circuit 82 and the NEXT compensation signal from the circuit 83 (canceling $NEXT_{12}$, $NEXT_{13}$, and $NEXT_{14}$) are also input to the summer 78. A non-linear echo compensation signal from a compensator 104 according to the present invention is also input to the summer 78. A signal ($TA_{comp}$) with linear and nonlinear echo compensation and NEXT compensation is output by the summer 78.

Figure 12:
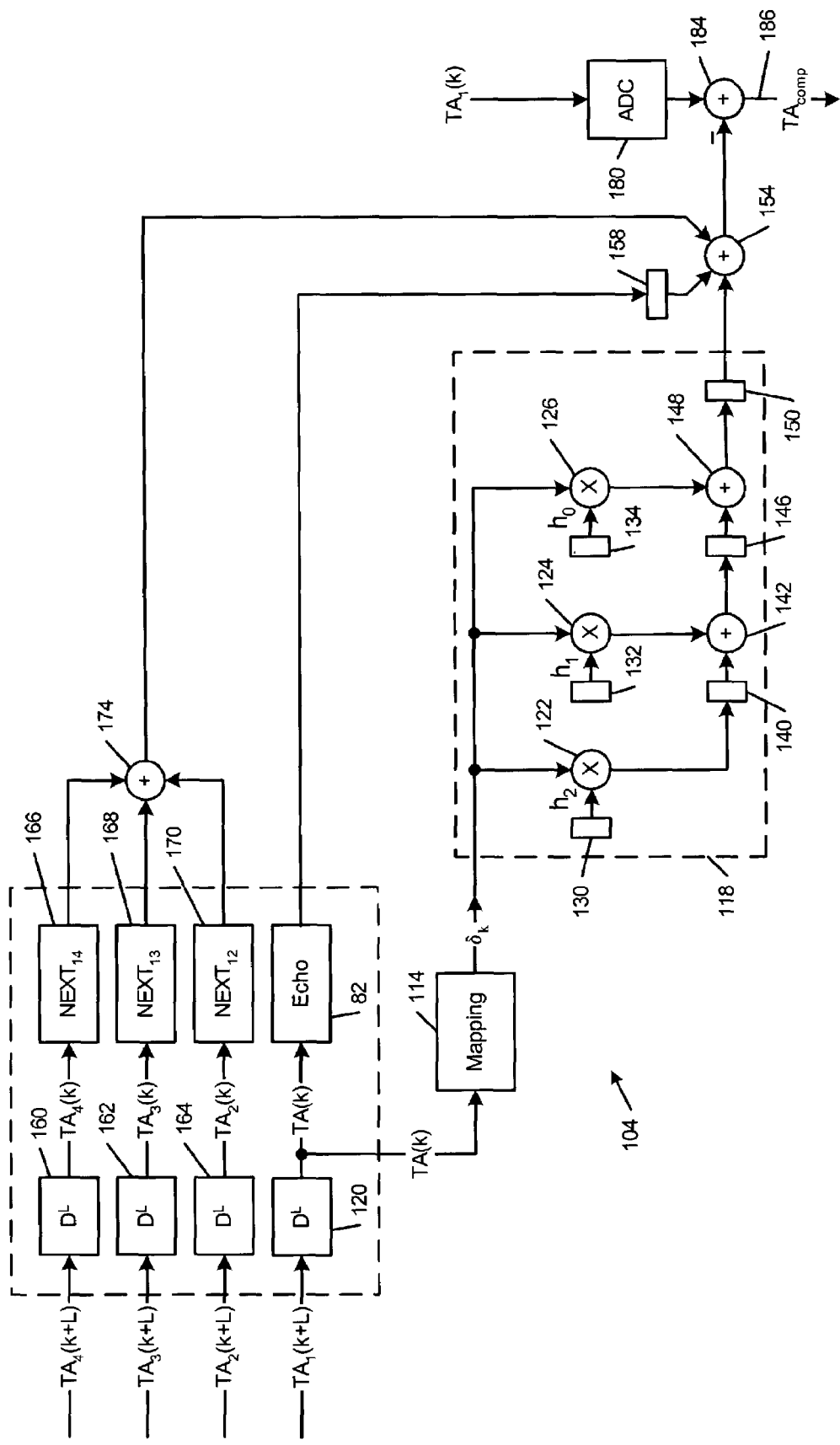
FIG. 12 illustrates a nonlinear echo compensation circuit according to the present invention.

Referring now to FIG. 12, the nonlinear echo compensator 104 is shown to include a mapping circuit 114 and a canceller circuit 118. A transmitted signal $TA_1(k+L)$ is input to a variable delay 120 that provides a delay of L clock cycles. The delayed transmitter signal is input to the linear echo compensation circuit 82 and the mapping circuit 114. The mapping circuit 114 outputs a pattern dependent driving signal $\delta_k$ to the canceller circuit 118. The pattern dependent driving signal is input to first inputs of first, second and third multipliers 122, 124 and 126. Another input of the multiplier 122 receives a third compensator coefficient $h_2$ from unit delay 130. As can be appreciated, unit delays can be implemented as a register or in any other suitable manner. A second input of the multiplier 124 receives a second compensator coefficient $h_1$ from unit delay 132. A second input of the multiplier 126 receives a first compensator coefficient ho from unit delay 134.

An output of the multiplier 122 is input to unit delay 140. An output of the unit delay 140 is input to a first input of a summer 142. An output of the multiplier 124 is input to a second input of the summer 142. An output of the summer 142 is input to unit delay 146. An output of the unit delay 146 is input to a first input of a summer 148. An output of the multiplier 126 is input to a second input of the summer 148. An output of the summer 148 is input to unit delay 150. An output of the unit delay 150 is input to a summer 154.

An output of the linear echo compensation circuit 82 is input to unit delay 158. An output of the unit delay 158 is input to the summer 154. Transmitter signals from other twisted pairs are input to variable delay circuits 160, 162 and 164. Outputs of the variable delay circuits 160, 162 and 164 are input to NEXT compensation circuits 166 168 and 170. Outputs of the NEXT compensation circuits 166, 168 and 170 are summed by a summer 174 and input to the summer 154. A filtered output of a summed received signal and a replica of a transmitted signal, indicated by arrow 175, is input to ADC 180 and output to a summer 184. An output of the summer 154 is input to an inverting input of the summer 184, which outputs the compensated signal ($TA_{comp}$) 186.

Figure 13:
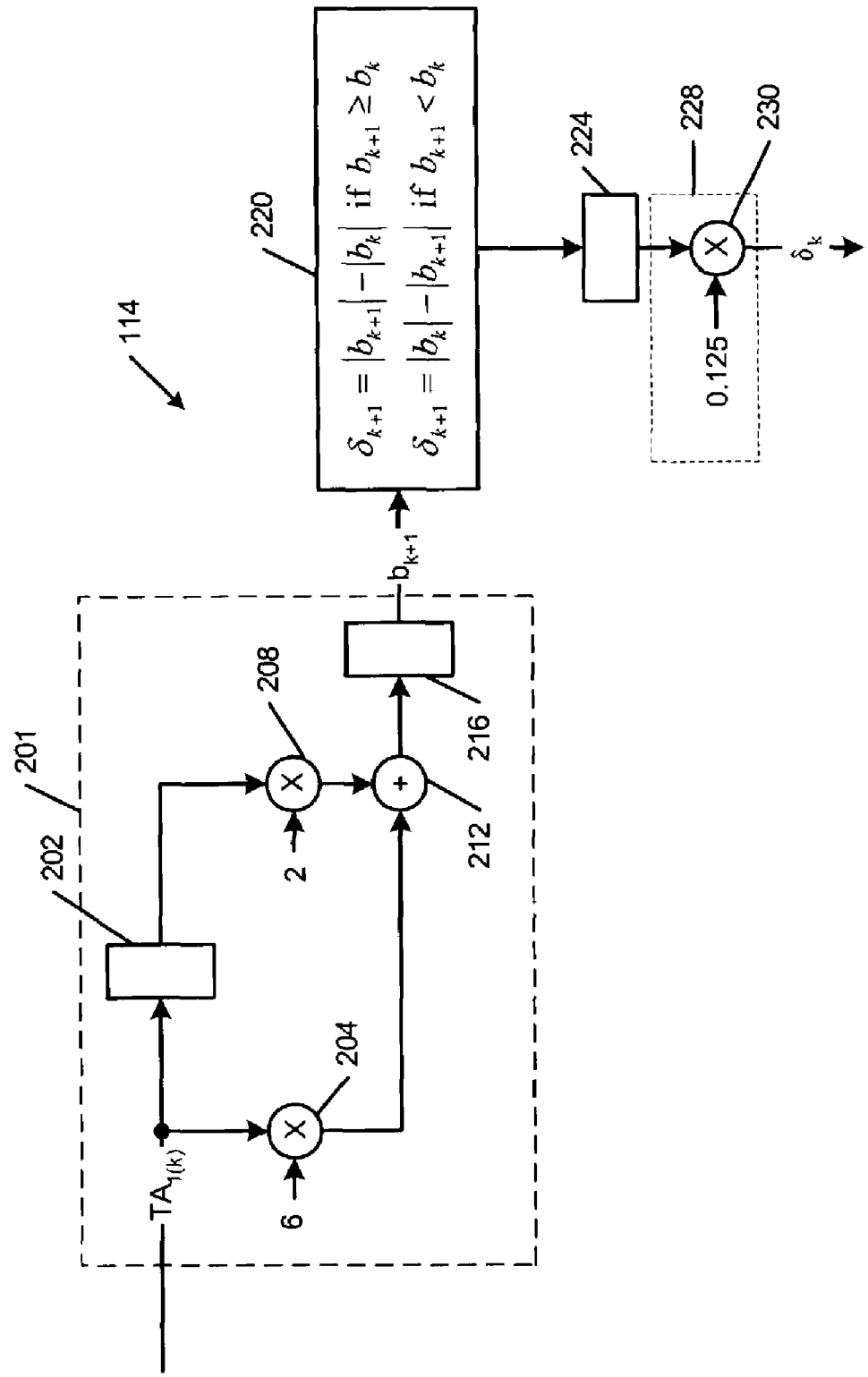
FIG. 13 illustrates a mapping circuit of FIG. 12 in further detail.

Referring now to FIG. 13, the mapping circuit 114 is illustrated in further detail. The mapping circuit 114 includes a weighting circuit 201. The transmitter signal is input to unit delay 202 and a first input of the multiplier 204. A second input of the multiplier 204 receives a first constant scale factor. An output of the unit delay 200 is input to a first input of a multiplier 208. A second input of the multiplier 208 is connected to a second constant scale factor. Outputs of the multipliers 204 and 208 are input to a summer 212. An output of the summer 212 is input to unit delay 216, which outputs a signal $b_{k+1}$ to a function generator 220. The function generator 220 outputs the pattern dependent driving signal (before delay and scaling) as follows:

$$\delta_{k+1}=|b_{k+1}|-|b_k| \text{ if } b_{k+1} \geq b_k$$

$$\delta_{k+1}=|b_k|-|b_{k+1}| \text{ if } b_{k+1}<b_k$$

The pattern dependent driving signal that is output by the function generator 220 is input to unit delay 224. An output of the unit delay 224 is input to a scaling circuit 228. One exemplary scaling circuit 228 includes a multiplier 230 having a first input coupled to the unit delay 224 and a second input coupled to a constant value. The scaling circuit 228 preferably offsets the effects of the weighting circuit 201, although other scaling may be performed. In the exemplary weighting circuit 201, the signal $TA_1(k)$ is multiplied by 6 and the signal $TA_1(k-1)$ is multiplied by 2. The scaling circuit 228 multiplies by ⅛.

Figure 14:
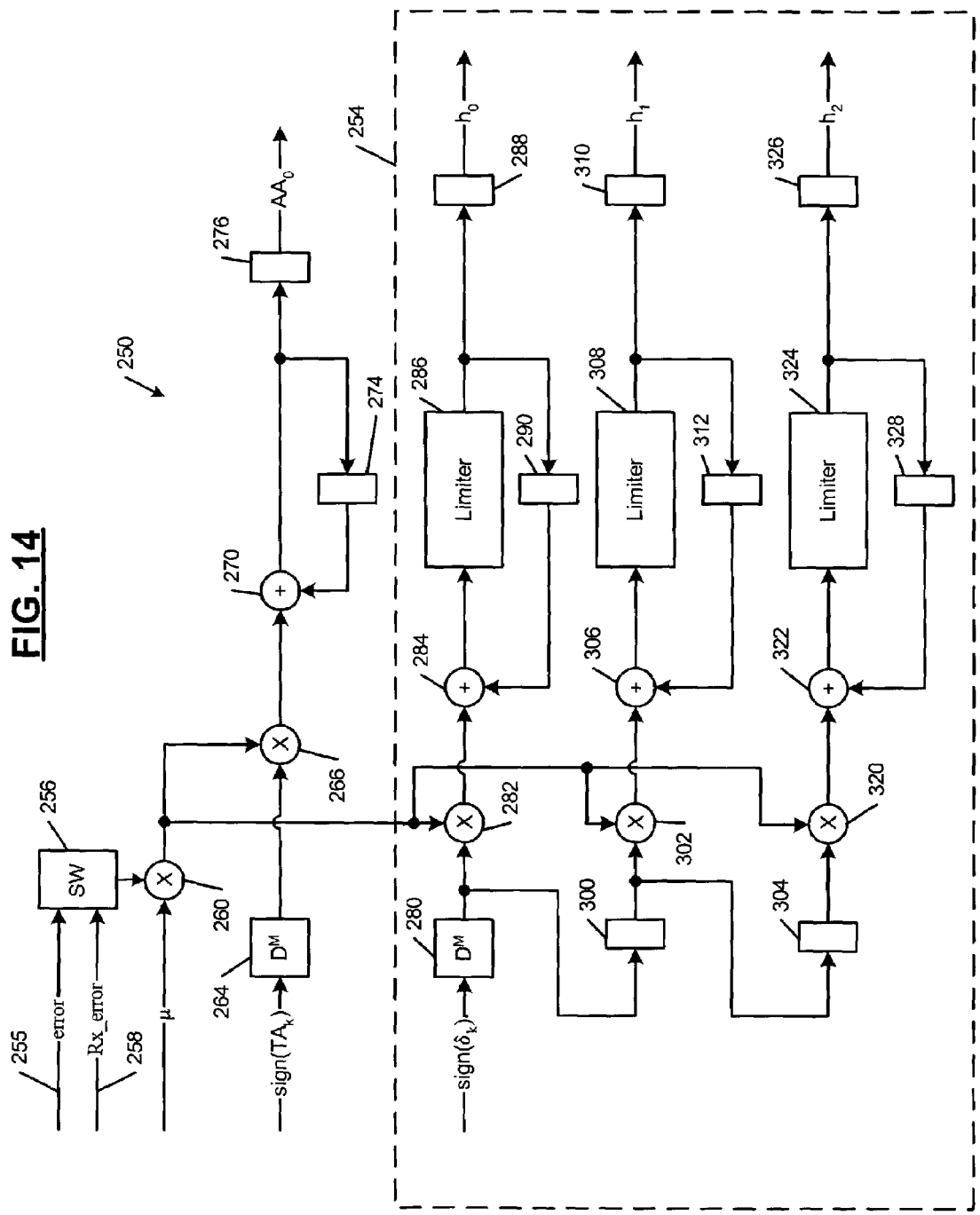
FIG. 14 illustrates a least means squared (LMS) circuit according to the present invention.

Referring now to FIG. 14, a least mean squared (LMS) circuit 250 is illustrated. The LMS circuit 250 includes a compensator coefficient generator 254. An error signal 255 is input to a selector switch 256. A receiver error signal 258 is also input to the selector switch 256. The selector switch 256 selects one of the error signals 255 or 258. The switch 256 preferably selects the output of the compensator (the summer 78 in FIG. 11) as the error signal when a remote transceiver has not sent signals. Ideally, the output of the summer 78 is zero since the receiver should not detect a signal. When an incoming signal is received, the switch 256 selects the error signal at the output of the followed detector, which eliminates the effect of the incoming signal in the error signal.

An output of the selector switch 256 is input to a multiplier 260. Another input of the multiplier 260 is coupled to a scaling factor or loop gain ($\mu$). An output of the multiplier 260 is input to the compensator coefficient generator 254. A sign function of the transmitted signal is input to a variable delay 264. An output of the variable delay is input to a multiplier 266. An output of the multiplier 260 is input to the multiplier 266. An output of the multiplier 266 is input to a summer 270. An output of the summer 270 is fed back through a unit delay 274 to the summer 270. An output of the summer 270 is input to unit delay 276. An output of the unit delay 276 provides a linear echo compensation signal ($AA_0$).

A sign function of the pattern dependent driving signal is input to a variable delay 280 of the compensator coefficient generator 254. An output of the variable delay 280 is input to a multiplier 282. An output of the multiplier 260 is also input to the multiplier 282. An output of the multiplier 282 is input to a summer 284. An output of the summer 284 is input to a limiter 286, which limits the signal input between upper and lower limits. For example, the limiter 286 may limit the signal to +/−1/32. An output of the limiter 286 is input to unit delay 288 and to unit delay 290. An output of the unit delay 290 is input to the summer 284. An output of the unit delay 288 provides the first compensator coefficient $h_0$ as follows:

$$h_0 \leftarrow h_0+\mu^* e_{k-L}^* \text{sign}(\delta_k)$$

An output of the variable delay 280 is input to unit delay 300. An output of the unit delay 300 is input to a multiplier 302 and unit delay 304. An output of the multiplier 260 is also input to the multiplier 302. An output of the multiplier 302 is input to a summer 306. An output of the summer 306 is input to a limiter 308. An output of the limiter 308 is input to unit delays 310 and 312. An output of the unit delay 312 is input to the summer 306. An output of the unit delay 310 provides the second compensator coefficient $h_1$ as follows:

$$h_1 \leftarrow h_1+\mu^* e_{k-L}^* \text{sign}(\delta_{k-1})$$

An output of the unit delay 304 is input to a multiplier 320. An output of the multiplier 260 is also input to the multiplier 320. An output of the multiplier 320 is input to a summer 322. An output of the summer 322 is input to a limiter 324. An output of the limiter 324 is input to unit delays 326 and 328.

An output of the unit delay 328 is input to the summer 322. An output of the unit delay 326 provides the third compensator coefficient $h_2$ as follows:

$$h_2 \leftarrow h_2 + \mu * e_{k-L} * \text{sign}(\delta_{k-2})$$

Figure 15:
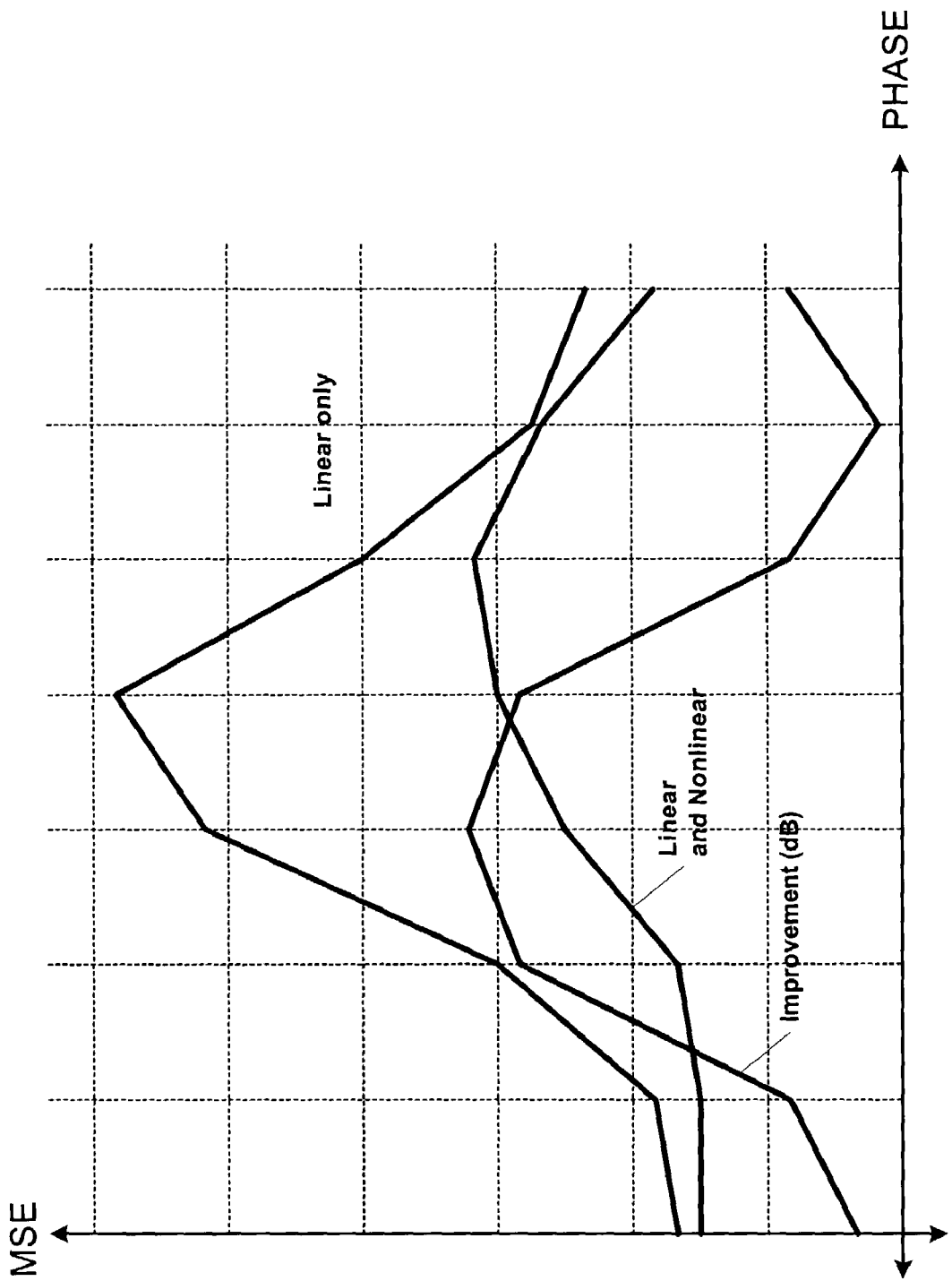
FIG. 15 illustrates mean squared error (MSE) as a function of sample phase for a first transceiver with linear echo compensation and a second transceiver according to the present invention with linear and nonlinear echo compensation.

Referring now to FIG. 15, mean squared error is shown as a function of sample phase. The mean squared error for transceivers with linear and nonlinear echo compensation according to the present invention is significantly lower than the mean squared error for transceivers with linear echo compensation.

Those skilled in the art can now appreciate from the foregoing description that the broad teachings of the present invention can be implemented in a variety of forms. Therefore, while this invention has been described in connection with particular examples thereof, the true scope of the invention should not be so limited since other modifications will become apparent to the skilled practitioner upon a study of the drawings, the specification and the following claims.

What is claimed is:

1. A nonlinear echo compensator in a transceiver including a transmitter line driver that is operated in an asymmetric low power mode, comprising:
    a mapping circuit that generates a pattern dependent driving signal based on asymmetry of the transmitter line driver; and
    a canceling circuit that communicates with said mapping circuit and that compensates for nonlinear echo in a received signal by generating a nonlinear echo compensation signal based on said pattern dependent driving signal,
    wherein said mapping circuit includes a symbol weighting circuit that generates a weighted signal, and
    wherein said symbol weighting circuit generates said weighted signal by summing a first product of a current symbol and a first weighting factor with a second product of a prior symbol and a second weighting factor.

2. The nonlinear echo compensator of claim 1 wherein said mapping circuit further includes a scaling circuit that scales said pattern dependent driving signal.

3. The nonlinear echo compensator of claim 1 wherein said transceiver further includes:
    a linear echo compensator that generates a linear echo compensation signal;
    a crosstalk signal generator that generates a near end crosstalk signal; and
    a third summer that communicates with said linear echo compensator, said crosstalk signal generator, and said nonlinear echo compensator and that generates a combined compensation signal.

4. The nonlinear echo compensator of claim 1 wherein said mapping circuit generates said pattern dependent driving signal based on operation of a class B line driver.

5. The nonlinear echo compensator of claim 1 wherein said pattern dependent driving signal is generated based on amplitudes of a weighted transmitted signal for sequential clock cycles.

6. A nonlinear echo compensator in a transceiver including a transmitter line driver that is operated in an asymmetric low power mode, comprising:
    a mapping circuit that generates a pattern dependent driving signal based on asymmetry of the transmitter line driver;
    a canceling circuit that communicates with said mapping circuit and that compensates for nonlinear echo in a received signal by generating a nonlinear echo compensation signal based on said pattern dependent driving signal; and
    a coefficient generator that generates a first compensator coefficient based on a sum of a prior compensator coefficient and a product of an error signal and a sign function of said pattern dependent driving signal,
    wherein said mapping circuit includes a symbol weighting circuit that generates a weighted signal.

7. The nonlinear echo compensator of claim 6 wherein said coefficient generator generates a compensator coefficient, and
    wherein said mapping circuit receives a multi-level signal and maps said multi-level signal to said pattern dependent driving signal.

8. The nonlinear echo compensator of claim 7 wherein said mapping circuit includes a symbol weighting circuit that generates a weighted signal.

9. The nonlinear echo compensator of claim 8 wherein said mapping circuit further includes a function generator that generates said pattern dependent driving signal based on said weighted signal.

10. The nonlinear echo compensator of claim 7 wherein said coefficient generator generates first, second and third compensator coefficients.

11. The nonlinear echo compensator of claim 10 wherein said canceling circuit includes:
    a first multiplier that has a first input that receives said pattern driving signal, that has a second input that receives said first compensator coefficient, and that generates a first product;
    a second multiplier that has a first input that receives said pattern driving signal, that has a second input that receives said second compensator coefficient, and that generates a second product; and
    a third multiplier that has a first input that receives said pattern driving signal, that has a second input that receives said third compensator coefficient, and that generates a third product.

12. The nonlinear echo compensator of claim 11 wherein said canceling circuit further includes:
    a first unit delay that receives said third product of said third multiplier;
    a first summer having a first input that receives said second product of said second multiplier and a second input that communicates with said first unit delay;
    a second unit delay that communicates with an output of said first summer; and
    a second summer having a first input that communicates with said second unit delay and a second input that receives said first product of said first multiplier.

13. A transceiver for an Ethernet network, comprising:
    a transmitter;
    a transmitter line driver including current cells that are operated in an asymmetric low power mode; and
    a nonlinear echo compensator with a mapping circuit that generates a pattern dependent driving signal based on asymmetry of the transmitter line driver, a coefficient generator that generates a compensator coefficient, and a canceling circuit that communicates with said mapping circuit and said coefficient generator and that compensates for nonlinear echo in a received signal by generating a nonlinear echo compensation signal based on said pattern dependent driving signal and said compensator coefficient,
    wherein said mapping circuit includes a symbol weighting circuit that generates a weighted signal, and wherein said symbol weighting circuit generates said weighted signal by summing a first product of a current symbol and a first weighting factor with a second product of a prior symbol and a second weighting factor.

14. The transceiver of claim 13 wherein said mapping circuit receives a multi-level signal and maps said multi-level signal to said pattern dependent driving signal.

15. The transceiver of claim 13 wherein said mapping circuit further includes a scaling circuit that scales said pattern dependent driving signal.

16. The transceiver of claim 13 wherein said mapping circuit further includes a function generator that generates said pattern dependent driving signal based on said weighted signal.

17. A transceiver for an Ethernet network, comprising:
a transmitter;
a transmitter line driver including current cells that are operated in an asymmetric low power mode; and
a nonlinear echo compensator with a mapping circuit that generates a pattern dependent driving signal based on asymmetry of the transmitter line driver, a coefficient generator that generates a compensator coefficient, and a canceling circuit that communicates with said mapping circuit and said coefficient generator and that compensates for nonlinear echo in a received signal by generating a nonlinear echo compensation signal based on said pattern dependent driving signal and said compensator coefficient,
wherein said coefficient generator generates a first compensator coefficient based on a sum of a prior compensator coefficient and a product of an error signal and a sign function of said pattern dependent driving signal.

18. The transceiver of claim 17 further comprising:
a linear echo compensator that generates a linear echo compensation signal;
a crosstalk signal generator that generates a near end crosstalk signal; and
a third summer that communicates with said linear echo compensator, said crosstalk signal generator, and said nonlinear echo compensator and that generates a combined compensation signal.

19. The transceiver of claim 17 wherein said coefficient generator generates first, second and third compensator coefficients.

20. The transceiver of claim 19 wherein said canceling circuit includes:
a first multiplier that has a first input that receives said pattern driving signal, that has a second input that receives said first compensator coefficient, and that generates a first product;
a second multiplier that has a first input that receives said pattern driving signal, that has a second input that receives said second compensator coefficient, and that generates a second product; and
a third multiplier that has a first input that receives said pattern driving signal, that has a second input that receives said third compensator coefficient, and that generates a third product.

21. The transceiver of claim 20 wherein said canceling circuit further includes:
a first unit delay that receives said third product of said third multiplier;
a first summer having a first input that receives said second product of said second multiplier and a second input that communicates with said first unit delay;
a second unit delay that communicates with an output of said first summer; and a second summer having a first input that communicates with said second unit delay and a second input that receives said first product of said first multiplier.

22. A mapping circuit for a nonlinear echo compensation circuit in a transceiver of an Ethernet network that includes a transmitter line driver that is operated in an asymmetric low power mode, comprising:
a symbol weighting circuit that generates a weighted signal;
a function generator that generates a pattern dependent driving signal based on said weighted signal and asymmetry of the transmitter line driver; and
a scaling circuit that scales said pattern dependent driving signal, wherein said symbol weighting circuit generates said weighted signal by summing a first product of a current symbol and a first weighting factor with a second product of a prior symbol and a second weighting factor.

23. The mapping circuit of claim 22 wherein said function generator generates said pattern dependent driving signal based on amplitudes of said weighted signal.

24. A nonlinear echo compensator in a transceiver including a transmitter line driver that is operated in an asymmetric low power mode, comprising:
mapping means for generating a pattern dependent driving signal based on asymmetry of the transmitter line driver; and
canceling means for communicating with said mapping means and for compensating nonlinear echo in a received signal by generating a nonlinear echo compensation signal based on said pattern dependent driving signal,
wherein said mapping means includes a symbol weighting means for generating a weighted signal, and
wherein said symbol weighting means generates said weighted signal by summing a first product of a current symbol and a first weighting factor with a second product of a prior symbol and a second weighting factor.

25. The nonlinear echo compensator of claim 24 further comprising coefficient generating means for generating a compensator coefficient, wherein said mapping means receives a multi-level signal and maps said multi-level signal to said pattern dependent driving signal.

26. The nonlinear echo compensator of claim 24 wherein said mapping means further includes function generating means for generating said pattern dependent driving signal based on said weighted signal.

27. The nonlinear echo compensator of claim 24 wherein said mapping means further includes scaling means for scaling said pattern dependent driving signal.

28. The nonlinear echo compensator of claim 24 wherein said transceiver further includes:
linear echo compensating means for generating a linear echo compensation signal;
crosstalk signal generating means for generating a near end crosstalk signal; and
third summing means that communicates with said linear echo compensator, said crosstalk signal generator, and said nonlinear echo compensator for generating a combined compensation signal.

29. A nonlinear echo compensator in a transceiver including a transmitter line driver that is operated in an asymmetric low power mode, comprising:
mapping means for generating a pattern dependent driving signal based on asymmetry of the transmitter line driver;
canceling means for communicating with said mapping means and for compensating nonlinear echo in a received signal by generating a nonlinear echo compensation signal based on said pattern dependent driving signal; and coefficient generating means for generating a compensator coefficient, wherein said mapping means receives a multi-level signal and maps said multi-level signal to said pattern dependent driving signal, wherein said coefficient generating means generates a first compensator coefficient based on a sum of a prior compensator coefficient and a product of an error signal and a sign function of said pattern dependent driving signal.

30. The nonlinear echo compensator of claim 29 wherein said coefficient generating means generates first, second and third compensator coefficients.

31. The nonlinear echo compensator of claim 30 wherein said canceling means includes:

first multiplying means, that has a first input that receives said pattern driving signal and that has a second input that receives said first compensator coefficient, for generating a first product;

second multiplying means, that has a first input that receives said pattern driving signal and that has a second input that receives said second compensator coefficient, for generating a second product; and third multiplying means, that has a first input that receives said pattern driving signal and that has a second input that receives said third compensator coefficient, for generating a third product.

32. The nonlinear echo compensator of claim 31 wherein said canceling means further includes:

a first unit delay that receives said third product of said third multiplying means;

a first summer having a first input that receives said second product of said second multiplying means and a second input that communicates with said first unit delay;

a second unit delay that communicates with an output of said first summer; and a second summer having a first input that communicates with said second unit delay and a second input that receives said first product of said first multiplying means.

33. A transceiver for an Ethernet network, comprising:
a transmitter;
transmitter line driving means for operating in an asymmetric low power mode; and
nonlinear echo compensating means for compensating for nonlinear echo and including mapping means for generating a pattern dependent driving signal based on asymmetry of the transmitter line driving means, coefficient generating means for generating a compensator coefficient, and canceling means for communicating with said mapping means and said coefficient generating means and for compensating nonlinear echo in a received signal by generating a nonlinear echo compensation signal based on said pattern dependent driving signal and said compensator coefficient,
wherein said mapping means includes a symbol weighting means for generating a weighted signal, and
wherein said symbol weighting means generates said weighted signal by summing a first product of a current symbol and a first weighting factor with a second product of a prior symbol and a second weighting factor.

34. The transceiver of claim 33 wherein said mapping means receives a multi-level signal and maps said multi-level signal to said pattern dependent driving signal.

35. The transceiver of claim 33 wherein said mapping means further includes function generating means for generating said pattern dependent driving signal based on said weighted signal.

36. The transceiver of claim 33 wherein said mapping means further includes scaling means for scaling said pattern dependent driving signal.

37. The transceiver of claim 33 wherein said transceiver further includes:

linear echo compensating means for generating a linear echo compensation signal;

crosstalk signal generating means for generating a near end crosstalk signal; and third summing means that communicates with said linear echo compensator, said crosstalk signal generator, and said nonlinear echo compensating means for generating a combined compensation signal.

38. A transceiver for an Ethernet network, comprising:
a transmitter;
transmitter line driving means for operating in an asymmetric low power mode; and
nonlinear echo compensating means for compensating for nonlinear echo and including mapping means for generating a pattern dependent driving signal based on asymmetry of the transmitter line driving means, coefficient generating means for generating a compensator coefficient, and canceling means for communicating with said mapping means and said coefficient generating means and for compensating nonlinear echo in a received signal by generating a nonlinear echo compensation signal based on said pattern dependent driving signal and said compensator coefficient,
wherein said coefficient generating means generates a first compensator coefficient based on a sum of a prior compensator coefficient and a product of an error signal and a sign function of said pattern dependent driving signal.

39. The transceiver of claim 38 wherein said coefficient generating means generates first, second and third compensator coefficients.

40. The transceiver of claim 39 wherein said canceling means includes:

first multiplying means, that has a first input that receives said pattern driving signal and that has a second input that receives said first compensator coefficient, for generating a first product;

second multiplying means, that has a first input that receives said pattern driving signal and that has a second input that receives said second compensator coefficient, for generating a second product; and third multiplying means, that has a first input that receives said pattern driving signal and that has a second input that receives said third compensator coefficient, for generating a third product.

41. The transceiver of claim 40 wherein said canceling means further includes:

a first unit delay that receives said third product of said third multiplying means;

a first summer having a first input that receives said second product of said second multiplying means and a second input that communicates with said first unit delay;

a second unit delay that communicates with an output of said first summer; and a second summer having a first input that communicates with said second unit delay and a second input that receives said first product of said first multiplying means.

42. A mapping circuit for a nonlinear echo compensation circuit in a transceiver of an Ethernet network that includes a transmitter line driver that is operated in an asymmetric low power mode, comprising:

symbol weighting means for generating a weighted signal;

function generating for generating a pattern dependent driving signal based on said weighted signal and asymmetry of the transmitter line driver; and scaling means for scaling said pattern dependent driving signal, wherein said symbol weighting means generates said weighted signal by summing a first product of a current symbol and a first weighting factor with a second product of a prior symbol and a second weighting factor.

43. A method for compensating for nonlinear echo in a transceiver including a transmitter line driver that is operated in an asymmetric low power mode, comprising:

generating a pattern dependent driving signal based on asymmetry of the transmitter line driver via a mapping circuit;

compensating for nonlinear echo in a received signal by generating a nonlinear echo compensation signal based on said pattern dependent driving signal; and generating said weighted signal by summing a first product of a current symbol and a first weighting factor with a second product of a prior symbol and a second weighting factor.

44. The method of claim 43 further comprising receiving a multi-level signal and mapping said multi-level signal to said pattern dependent driving signal.

45. The method of claim 44 further comprising generating a weighted signal.

46. The method of claim 45 further comprising generating said pattern dependent driving signal based on said weighted signal.

47. The method of claim 45 further comprising scaling said pattern dependent driving signal.

48. The method of claim 45 further comprising:

generating a linear echo compensation signal;

generating a near end crosstalk signal; and generating a combined compensation signal from said linear echo compensation signal, said near end crosstalk signal and said nonlinear echo compensation signal.

49. A method for compensating for nonlinear echo in a transceiver including a transmitter line driver that is operated in an asymmetric low power mode, comprising:

generating a pattern dependent driving signal based on asymmetry of the transmitter line driver via a mapping circuit;

compensating for nonlinear echo in a received signal by generating a nonlinear echo compensation signal based on said pattern dependent driving signal; and generating a first compensator coefficient based on a sum of a prior compensator coefficient and a product of an error signal and a sign function of said pattern dependent driving signal.

50. The method of claim 49 further comprising generating first, second and third compensator coefficients.

51. The method of claim 50 further comprising:

generating a first product of said pattern driving signal and said first compensator coefficient;

generating a second product of said pattern driving signal and said second compensator coefficient; and generating a third product of said pattern driving signal and said third compensator coefficient.

52. The method of claim 51 further comprising:

delaying said third product of said third multiplier using a first unit delay;

summing said second product of said second multiplier and said first unit delay;

delaying an output of said first summer using a second unit delay; and summing an output of said second unit delay and said first product.

53. A method of generating a pattern dependant driving signal for a nonlinear echo compensation circuit in a transceiver of an Ethernet network that includes a transmitter line driver that is operated in an asymmetric low power mode, comprising:

generating a weighted signal;

generating a pattern dependent driving signal based on said weighted signal and asymmetry of the transmitter line driver via a mapping circuit;

generating said weighted signal by generating a first product of a current symbol and a first weighting factor; and generating a second product of a prior symbol and a second weighting factor.

54. The method of claim 53 further comprising scaling said pattern dependent driving signal.

55. The method of claim 53 further comprising generating said weighted signal by generating a first product of a current symbol and a first weighting factor.

56. The method of claim 53 further comprising summing said first and second products.

\* \* \* \* \*

UNITED STATES PATENT AND TRADEMARK OFFICE
CERTIFICATE OF CORRECTION

PATENT NO. : 7,409,057 B1
APPLICATION NO. : 10/189321
DATED : August 5, 2008
INVENTOR(S) : Xiaopeng Chen et al.

It is certified that error appears in the above-identified patent and that said Letters Patent is hereby corrected as shown below:

Column 5, Line 29　　　　　　Delete "ho" and insert -- $h_0$ --

Signed and Sealed this

Ninth Day of December, 2008

JON W. DUDAS
*Director of the United States Patent and Trademark Office*